United States Patent
Soltani et al.

(10) Patent No.: US 8,594,997 B2
(45) Date of Patent: Nov. 26, 2013

(54) CONTEXT-AWARE CONVERSATIONAL USER INTERFACE

(75) Inventors: Anoshirwan Soltani, Frankfurt (DE); Markus Latzina, Wiesenbach (DE); Matthias Kaiser, Walldorf (DE)

(73) Assignee: SAP AG, Walldorf (DE)

( * ) Notice: Subject to any disclaimer, the term of this patent is extended or adjusted under 35 U.S.C. 154(b) by 79 days.

(21) Appl. No.: 12/891,417

(22) Filed: Sep. 27, 2010

(65) Prior Publication Data

US 2012/0078611 A1    Mar. 29, 2012

(51) Int. Cl.
*G06F 17/27* (2006.01)

(52) U.S. Cl.
USPC ...... 704/9; 704/1; 704/10; 704/257; 704/275; 707/706; 707/707; 707/708

(58) Field of Classification Search
USPC ............. 704/1, 9, 10, 257, 275; 707/706–708
See application file for complete search history.

(56) References Cited

U.S. PATENT DOCUMENTS

| | | | |
|---|---|---|---|
| 6,570,555 B1 * | 5/2003 | Prevost et al. | 345/156 |
| 7,480,619 B1 * | 1/2009 | Scott | 704/275 |
| 7,590,224 B1 * | 9/2009 | Gorin et al. | 379/88.13 |
| 2002/0135618 A1 * | 9/2002 | Maes et al. | 345/767 |
| 2003/0023435 A1 | 1/2003 | Josephson | |
| 2005/0125232 A1 * | 6/2005 | Gadd | 704/270.1 |
| 2006/0264749 A1 * | 11/2006 | Weiner et al. | 600/437 |
| 2007/0100790 A1 * | 5/2007 | Cheyer et al. | 707/1 |
| 2007/0297648 A1 * | 12/2007 | Endoh et al. | 382/115 |
| 2009/0150156 A1 * | 6/2009 | Kennewick et al. | 704/257 |
| 2010/0088100 A1 | 4/2010 | Lindahl | |
| 2010/0198401 A1 * | 8/2010 | Waugh et al. | 700/237 |
| 2010/0225450 A1 * | 9/2010 | Fischer et al. | 340/10.4 |
| 2010/0301995 A1 * | 12/2010 | Nguyen et al. | 340/5.2 |

FOREIGN PATENT DOCUMENTS

| | | | |
|---|---|---|---|
| JP | 2008059237 A | * | 3/2008 |
| WO | 2005096750 A2 | | 10/2005 |

OTHER PUBLICATIONS

Extended EP Search Report for EP Application No. 11007054.7, mailed Nov. 24, 2011, 6 pages.

* cited by examiner

*Primary Examiner* — Lamont Spooner
(74) *Attorney, Agent, or Firm* — Brake Hughes Bellermann LLP

(57) ABSTRACT

An input handler may receive natural language input associated with a command from a user through a user interface, and a language parser may parse the natural language input to determine parsed natural language input. A context monitor may receive context information associated with the user, and a context parser may parse the context information to obtain parsed context information associated with the natural language input and with the command. A command interpreter may interpret the parsed natural language input, using the parsed context information, to thereby determine the command.

20 Claims, 4 Drawing Sheets

CONTEXT-AWARE CONVERSATIONAL USER INTERFACE

TECHNICAL FIELD

This description relates to conversational user interfaces.

BACKGROUND

User interfaces are often used for the purpose of receiving a command from a user, and thereafter implementing the command, e.g., enabling execution of actions specified by the command. For example, graphical user interfaces, such as, for example, graphical user interfaces provided in conjunction with a website provided over the internet (or any graphical user interface provided locally or over a network) may include a text entry field with which a user of the graphical interface may enter a request or other command. Consequently, a provider of the website in question may receive the command, and may provide an output indicating completion thereof, using the graphical user interface. For example, the website in question may include an e-commerce or other transaction-based website, so that the command may include a request for a purchase or other transaction designed by the user, while the output associated with completion of the command may include confirmation of the transaction.

In other examples, enterprise software may include a user interface which is designed to allow a user to implement a command associated with executing functionality of the enterprise software. For example, such enterprise software may include, e.g., enterprise resource planning (ERP) software, supply chain management (SCM) software, customer relationship management (CRM) software, or other software associated with facilitating efficient execution of business processes. In these and other examples, then, associated user interfaces may be provided which enable users thereof to execute or otherwise implement the various associated business processes.

More generally, user interfaces associated with software may be used to implement, or enable implementation of, virtually any desired type of command. For example, as referenced above, such commands may be associated with implementation of associated software functionality, or, in other examples, may be associated with a physical effect or action. In examples of the latter, for example, a user interface may be associated with performing a physical action, such as transporting goods, opening a door or other entry way, taking a measurement, or virtually any other available action that may be associated with the received command.

Often, it may occur that a given user interface is associated with a large number of commands, and/or may require particular syntax and semantics when receiving the command, in order to be able to recognize the command and implement any associated actions. At the same time, it may occur that users of the user interface may have difficulty remembering available commands and associated syntax, semantics, or other necessary characteristics. Similarly, other difficulties may contribute to a reduced ability of users to benefit from available commands associated with the user interface. For example, users may erroneously enter only a portion of a desired command, or may otherwise fail to provide complete and accurate versions of commands associated with desired actions. As a result, associated user interfaces may fail to provide a desired level of accurate, consistent, complete, and convenient implementation of one or more associated commands.

SUMMARY

According to one general aspect, a computer system including instructions recorded on a computer-readable storage medium and readable by at least one processor may include an input handler configured to cause the at least one processor to receive natural language input associated with a command from a user through a user interface. The system also may include a language parser configured to cause the at least one processor to parse the natural language input to determine parsed natural language input, a context monitor configured to cause the at least one processor to receive context information associated with the user, a context parser configured to cause the at least one processor to parse the context information to obtain parsed context information associated with the natural language input and with the command, and a command interpreter configured to cause the at least one processor to interpret the parsed natural language input, using the parsed context information, to thereby determine the command.

According to another general aspect, a computer-implemented method for causing at least one processor to execute instructions recorded on a computer-readable storage medium may include receiving natural language input associated with a command from a user through a user interface, parsing the natural language input to determine parsed natural language input, receiving context information associated with the user, parsing the context information to obtain parsed context information associated with the natural language input and with the command, and interpreting the parsed natural language input, using the parsed context information, to thereby determine the command.

According to another general aspect, a computer program product may be tangibly embodied on a computer-readable medium and may include instructions that, when executed, are configured to cause at least one processor to receive natural language input associated with a command from a user through a user interface, parse the natural language input to determine parsed natural language input, receive context information associated with the user, parse the context information to obtain parsed context information associated with the natural language input and with the command, and interpret the parsed natural language input, using the parsed context information, to thereby determine the command.

The details of one or more implementations are set forth in the accompanying drawings and the description below. Other features will be apparent from the description and drawings, and from the claims.

DETAILED DESCRIPTION

Figure 1:
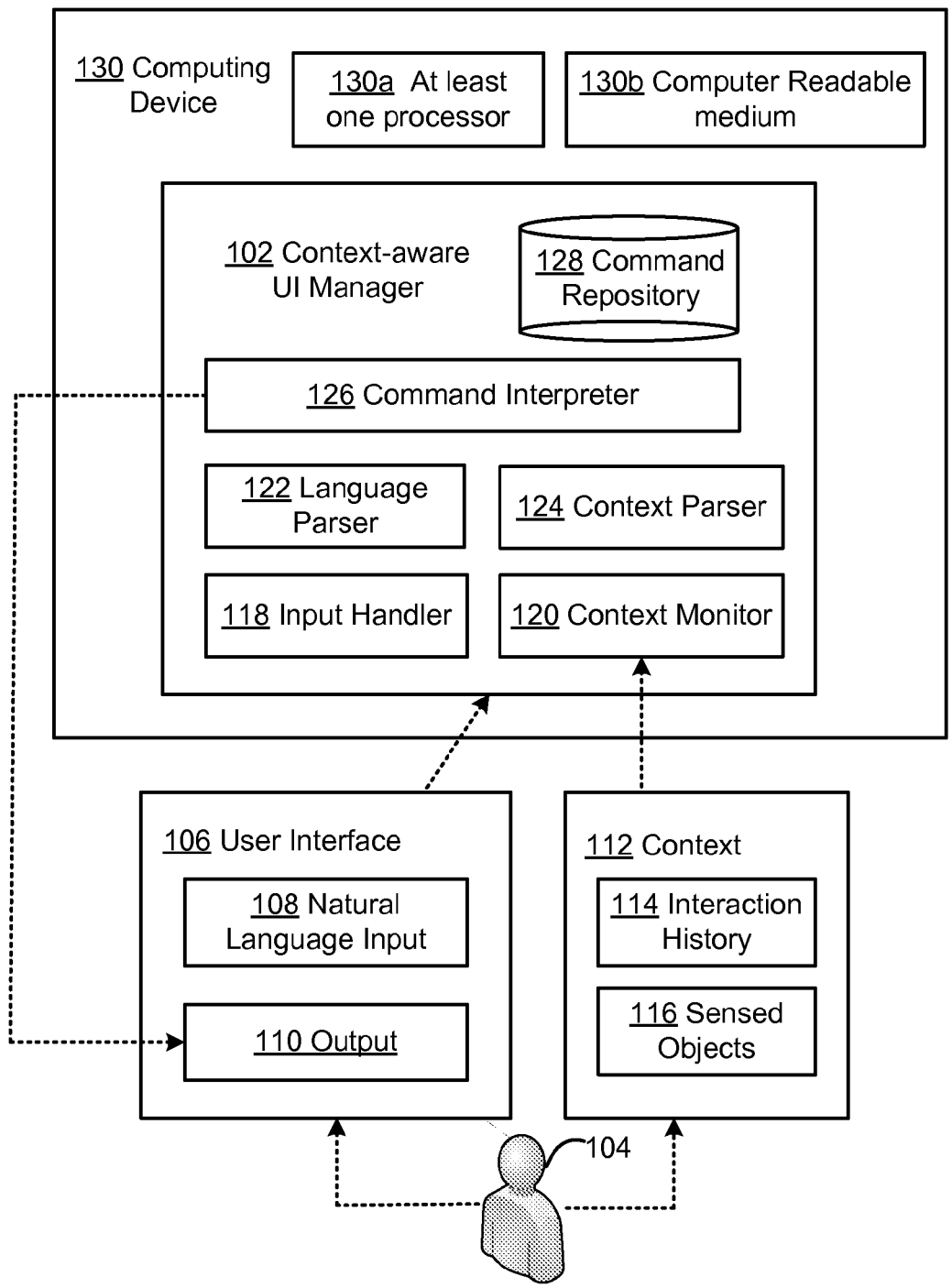
FIG. 1 is a block diagram of a system for implementing context-aware conversional user interfaces.

FIG. 1 is a block diagram of a system 100 for implementing context-aware conversional user interfaces. In the example of FIG. 1, a context-aware user interface (UI) manager 102 may be configured to receive input from a user 104 that is related to a command desired by the user 104, using a user interface 106. More specifically, as described in detail herein, the user interface 106 may receive natural language input 108 from the user 104 related to the command desired by the user 104, and may thereafter provide output 110 indicating validation and/or completion of the specified command and any executed actions associated therewith.

In the example of FIG. 1, the context-aware UI manager 102 determines the output 110 using the natural language input 108, in conjunction with a context 112 of the user 104. In the setting of FIG. 1, and as described in detail herein, the context 112 associated with the user 104 may refer to virtually any information associated with the user 104 which may be instrumental in conjunction with the natural language input 108 in enabling the context-aware UI manager 102 to provide the output 110.

Merely for the sake of example and explaining the system 100 of FIG. 1, the context 112 may include an interaction history 114 of the user 104 in interacting with the user interface 106. For example, the user interface 106 may include a graphical user interface which include various numbers and types of icons, widgets, links, and other interface elements which may conventionally be used to enable the user 104 to perform desired functionality associated with the user interface 106. The interaction history 114 may thus include, e.g., previously-completed interactions, or a current state or status of an ongoing interaction. In these and similar examples, it may be appreciated that the context information 112, although illustrated separately in FIG. 1 in order to illustrate the distinction thereof from the natural language input 108 and the output 110, may be included within (i.e., determined from) the user interface 106.

In additional or alternative examples, the context 112 may include sensed objects 116 which may be associated with the user 104. For example, as referenced below, the system 100 may implement radio frequency ID (RFID) sensors, or other known types of sensors, in order to detect physical information about the user 104, or about objects associated with the user 104. Somewhat similarly, other context information (e.g., a title, role, security level, or other information) about the user may be obtained by accessing a local or remote database (not specifically illustrated in the example of FIG. 1) which includes such desired context information. Many other types and examples of the context information 112 are provided herein, or would be apparent one of skill in the art.

Thus, the system 100 of FIG. 1 benefits from use of the natural language input 108, while providing consistent and accurate results within the output 110. That is, as referenced above, the user interface 106 may be associated with a large number of commands which may be desired or required by the user 104. Moreover, each such command may be associated with a particular syntax, semantics, or other requirements. Consequently, as referenced above, it may be difficult for the user 104 to remember and/or provide sufficient detail about how to enter a desired command to thereby achieve a corresponding result.

In the example of FIG. 1, however, use of the natural language input 108 may enable the user 104 to enter some or all of a desired command in a conversational, colloquial, or idiosyncratic manner, thereby relieving the user 104 of some or all of the burden of remembering a desired command. Moreover, the natural language input 108, in the system 100, may enable the user 104 to obtain a desired result, even if the user 104 enters only a portion of a desired command (e.g., omits required details).

Conversational or natural language input, such as the natural language input 108, are, by itself, generally well-known. Therefore, aside from those mentioned herein, various other features of conventional natural language systems would be well known to one of skill in the art, and therefore are not described in further detail herein, except as may be necessary or helpful in understanding operations of the system 100 of FIG. 1.

Generally, however, as just referenced, such inputs allow the user 104 to provide input in a style which is informal, and which, to varying extents, does not require specific knowledge or techniques on the part of the user 104. For example, natural language input may be completely unconstrained, so that any language received from the user 104 may be received and interpreted. In other examples, there may be constraints placed on the vocabulary available to the user 104, without any associated constraints placed on how the constrained vocabulary must be entered (e.g., no constraints on an order or phrasing thereof). Thus, various techniques are known for receiving and processing such a natural language input, with varying degrees of accuracy.

Conventional systems, however, may struggle to accurately recognize and interpret natural language input from users in various settings or scenarios. For example, when receiving natural language input using speech recognition software, users who have a heavy accent or other speech pattern which is unconventional or not readily recognized may struggle to have their commands recognized and implemented. More generally, systems receiving natural language input with fewer constraints may have lower levels of accuracy than those which impose more of such constraints (at the cost of placing more demands on the user(s)). Thus, in general, it may be appreciated that conventional natural language systems may benefit from an approved level of accuracy in recognizing received commands, so as to be better able to provide a corresponding desired action.

Thus, in the example of FIG. 1, an input handler 118 receives the natural language input 108, and performs, at least in part, otherwise conventional receipt and handling thereof. Further in the example of FIG. 1, a context monitor 120 is configured to receive, detect, or otherwise determine information regarding the context 112. As described herein, the context-aware UI manager 102 may thus utilize both the natural language input as received by the input handler 118, and the context (or portions thereof) as received by the context monitor 120, so as to be better able to more accurately provide the output 110 corresponding to a desired command and/or associated action for the user 104.

As referenced above, the context monitor 120 may perform monitoring of various types of context information associated with the context 112, depending on an overall setting or scenario associated with the system 100 of FIG. 1. Specific detailed examples are provide below, but as may be appreciated from the above discussion, context monitor 120 may include, for example, software which is designed to track the interaction history 114 of the user 104, e.g., with respect to the user interface 106. In other examples, the context monitor 120 may include software and/or hardware, e.g., one or more hardware sensors, which are configured to sense or otherwise detect information about a current context of the user 104. For example, as described in detail herein, the user 104 may be associated with an RFID tag or other sensed objects 116 which may be detected by the context monitor 120.

The conversational, context-aware UI manager 102 may be configured to execute or otherwise obtain a desired type and extent of abstraction for the natural language input 108 as received by the input handler 118, as well as for the context 112 as received by the context monitor 120. That is, for example, as described in detail herein, the context-aware UI manager 102 may be configured to convert, format, or otherwise translate information received from the input handler 118 and/or the context monitor 120, so as to express all such received information in a manner that may be meaningfully compared, interpreted, leveraged, or otherwise used in ascertaining a desired command and subsequent action of the user 104.

Specifically, as shown in the example of FIG. 1, the context-aware UI manager 102 may include a language parser 122 and a context parser 124 which may be configured to perform the various types of abstractions, conversions, and other types of processing just referenced. For example, the language parser 122 may be configured to receive the natural language input 108 from the input handler 118, and thereafter to execute various types of reasoning and other processing thereon. Similarly, the context parser 124 may be configured to receive the context information 112, and to process the context information 112 in a manner which is designed to facilitate subsequent interpretation of the parsed natural language provided by the language parser 122.

Specifically, as shown, a command interpreter 126 may be configured to receive parsed language from the language parser 122, and to received parsed context from the context parser 124, and to thereafter interpret the parsed language and parsed context, in conjunction with one or more commands from a command repository 128, so as to thereby deduce or otherwise determine the command and subsequent action designed by the user 104, and so as to thereby provide the corresponding output 110. In this way, as described herein, the user 104 may be provided with an increased accuracy and completeness of the output 110, and therefore may be more likely to experience desired results in a convenient fashion, while minimizing a level of knowledge required to obtain such desired results.

For example, the language parser 122 may be configured to receive the natural language input 108 from the input handler 118, and to thereafter perform linguistic, syntactical, semantic, grammatical, or other types of analysis thereon. In this way, the language parser 122 may thereby characterize the natural language input 108, and specific portions thereof, in a manner which is designed to be compatible for comparison with the parsed context information provided by the context parser 124.

By way of non-limiting example, the language parser 122 may characterize specific portions of the natural language input 108 as having specific grammatical functions within the natural language input 108. For example, the language parser 122 may designate specific words of the natural language input as corresponding to a subject, verb, or object, or other sentence element, within the natural language input 108. Somewhat similarly, the language parser 108 may perform semantic processing on the natural language input, e.g., may attempt to determine whether a word having multiple semantic meanings (e.g., "bank") has a particular semantic meaning within the natural language input 108 (e.g., referencing a financial institution as opposed to a riverbank). In yet another example, the language parser 122 may make certain deductions about a syntax of the received natural language input 108, such as determining whether a six digit number in the format xx-yy-zz refers to a date, or whether a different date format is used for expressing a desired date. The language parser 122 may use various known techniques to determine a final version of parsed natural language input, such as, for example, using stochastic, probabilistic, or statistical analysis to accomplish the above and related goals. These and other examples of such language parsing of natural language input, by themselves, may be known, and are therefore not described herein in detail, as except as may be necessary or helpful in understanding operations of the system 100 of FIG. 1.

In the example of the system 100 of FIG. 1, however, as described herein, the language parser 122 is specifically configured to execute such language parsing in a manner which provides resulting parsed language in a form or format which is compatible with parsed context from the context parser 124. Consequently, the command interpreter 126 may be enabled to leverage the parsed context from the context monitor 124 when attempting to execute interpretation of the natural language input 108 in order to determine a desired command from the command repository 128.

Meanwhile, as referenced above, the context monitor 120 may receive the context information 112. For example, the context monitor 120 may receive the context information 112 on a continuous basis, or may receive context information in advance of, or in response to, an action of the user 104. The context monitor 120 may detect the context 112 in relation to the natural language input 108. For example, the context monitor 120 may be triggered to begin collecting the context information 112 upon selection or other viewing of the user interface 106 by the user 104. In other examples, the context monitor 120 may collect context information 112 based on an actual or anticipated selection of a user interface element of the user interface 106 for inputting the natural language input 108. Various other examples of operations of the context monitor 120 are described herein, or would apparent.

In general, however, it may be appreciated that the context information 112 is generally related to, or associated with, the user 104. For example, as described herein, the context information 112 may include information related to actions or selections of the user 104, or may include information about objects which are detected based on their proximity, ownership of, or other relationship to, the user 104.

The context parser 124 may thus be configured, as referenced above, to receive context information from the context monitor 120, and to analyze, categorize, characterize, or otherwise parse the context information 112 to obtain parsed context information determined to be related to the natural language input 108 and/or the associated command desired by the user 104. Further, as described in more detail herein, the parsed context information may be expressed by the context parser 124 in a manner which enables relevant comparison thereof with the parsed language from the language parser 122. In other words, the language parser 122 and the context parser 124 may provide their respective parsed outputs to the command interpreter 126 in a manner which is designed to enable the command interpreter 126 to determine the appropriate desired command from the command repository 128. In this way, as described, the command interpreter 126 may be enabled to accurately and consistently provide the output 110 as including a desired command and/or implementation of various associated actions.

In the example of FIG. 1, the context-aware UI manager 102 is illustrated as executing on a computing device 130 which may be appreciated to include various standard components. For example, as illustrated, the computing device 130 may include at least one processor 130A which is configured to execute instructions stored on computer readable medium 130B. Of course, such configurations are merely intended as non-limiting examples, and many other variations would be apparent to one of skill in the art.

For example, the context-aware UI manager 102 may be implemented on a plurality of computing devices. For example, portions of the context-aware UI manager 102 may be executed on a remote, backend server, while other portions of the context-aware UI manager 102 may be implemented locally to the user 104. More specifically, for example, the parsers 122, 124 and the command interpreter 126 may be located together with the command repository 128 on a remote server. Meanwhile, the input handler 118 and the context monitor 120 may be executed within a client device that is local to the user 104, e.g., may be implemented in association with a browser providing the user interface 106.

In still other examples, the context monitor 120 may include hardware configured to receive data from one or more sensors collecting the context information 112. In this regard, it may be appreciated that various types of the context monitor 120 may be utilized to collect various corresponding types of context information 112. For example, a first context monitor may collect information about the interaction history 114 of the user 104 with UI element(s) of the user interface 106, while a second context monitor operates in conjunction with one or more environmental sensors configured to detect sensed information which is in proximity to, or otherwise related to, the user 104. Various other examples of implementations of the system 100 of FIG. 1 are described below in more detail, or would be apparent to one of skill in the art.

Figure 2:
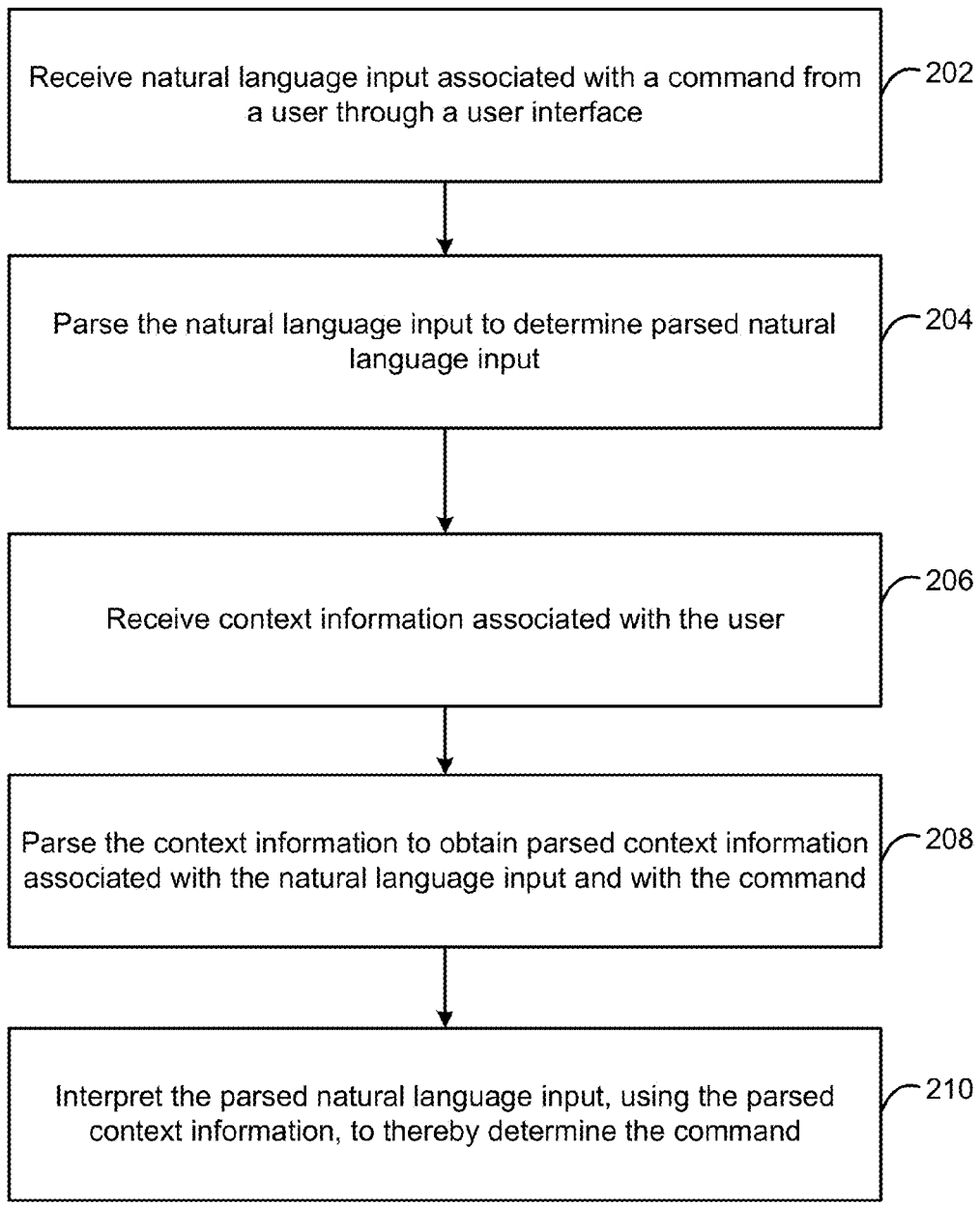
FIG. 2 is a flowchart illustrating example operations of the system of FIG. 1.

FIG. 2 is a flowchart 200 illustrating example operations 202-210 of the system 100 of FIG. 1. Although the operations 202-210 of the flowchart 200 of FIG. 2 are illustrated in sequential order, for the sake of example and for clarity of explanation and illustration, it may be appreciated that many other variations and implementations of the flowchart 200 may be executed by the system 100 of FIG. 1. For example, various operations of the flowchart 200 may be executed in a partially overlapping or parallel fashion. In other examples, operations of the flowchart 200 may be executed in an order different than that shown. Additionally, operations of the flowchart 200 may be omitted, replaced by alternate operations, or supplemented with additional operations, as would be apparent to one of skill in the art.

Thus, in the example of FIG. 2, natural language input associated with a command may be received from a user through a user interface (202). For example, the input handler 118 of FIG. 1 may receive natural language input 108 from the user 104, where the natural language 108 is provided through the user interface 106 and associated with a command of the command repository 128. For example, the natural language input 108 may be spoken by the user 104, and the input handler 118 may include speech recognition software configured to recognize such spoken word input. In other examples, the user interface 106 may include an appropriate text entry field for receiving the natural language input 108 as typed text entered by the user 104. As referenced above, various implementations of natural language recognition may be used. For example, the input handler 118 may require that the natural language input 108 be recognized in conjunction with a constrained vocabulary, or, in other examples, the input handler 118 may be configured to receive completely unconstrained natural language statements from the user 104.

In various examples, the user interface 106 may include a graphical user interface (GUI) that is provided to the user 104 on an appropriate display device. For example, the user interface 106 may include a graphical user interface provided to the user 104 on a mobile device (e.g., laptop, tablet, or smart phone) of the user 104. Of course, the user interface 106 may be provided on an appropriate display device of virtually any computing device.

The user interface 106 also may be provided in more specialized context. For example, the user interface 106 may be provided as part of a display of an otherwise special purpose device, such as a security or access device (as described in more detail below with respect to the example of FIG. 4). In still other examples, such as those referenced above in which the natural language input is received as a spoken word input, the user interface 106 may be implemented primarily or entirely as an auditory user interface.

Further with respect to FIGS. 1 and 2, and as referenced above, it will be appreciated that the term command may reference virtually any expression of identification of, or desire for, a particular action or result. For example, such commands may relate to commercial transactions or other financially related actions, or may relate to business processes implemented by the user 104.

In the latter example, for example, it may be appreciated that the user 104 may be tasked with performing some or all of a business process or workflow which comprises one or more tasks, and which may be executed using an orchestration engine. In such cases, as is well known, tasks of the processes/workflows may require instantiation or execution thereof in a particular setting. Consequently, the system 100 of FIG. 1 may be viewed as enabling such instantiation and associated execution of an otherwise generic task of a business process or workflow, so that the overall process or workflow may proceed efficiently in a desired manner. Many other examples of commands which may be implemented by the system 100 of FIG. 1 are provided herein, or would be apparent to one of skill in the art.

Further in the example of FIG. 2, it may be determined that the natural language input is insufficient to determine the command. For example, the input handler 118, perhaps in conjunction with the command interpreter 126, may be configured to determine that the natural language input 108 is insufficient to enable selection of a desired command from the command repository 128. Consequently, based on the natural language input 108 alone, it may be difficult or impossible to determine the desired command and therefore to enable subsequent execution of any associated actions or results.

For example, the natural language input 108 may simply omit necessary elements associated with determining the command. For example, the natural language input 108 may be associated with selecting a command for initiating a shipment of an item, and may specify a destination of the shipment, but not an origin of the shipment, or vice versa.

In other examples, the natural language input 108 may be insufficient in the sense that it is provided in a colloquial or idiosyncratic manner, e.g., using a slang or other terminology which is inconsistent, or not recognized by, the input handler 118. For example, the user 104 may previously have been employed by a first company, and may have recently become employed by a second company which provides the user interface 106. In such an example, the user 104 may inadvertently provide terminology associated with the desired business process and used by the first company, which may be inconsistent with, or incorrect, usage in an implementation of the same command in the setting of the second company, i.e., the current employer of the user 104.

In still other examples, the natural language input 108 may be insufficient in the sense of simply not including associated information which may be useful in determining and/or executing the command and associated actions or results. For example, the natural language input 108 may be associated with a command that requires a certain level of authentication or other security related information, which is not provided with, or included in, the natural language input 108.

One or more techniques may be used to determine the insufficiency of the natural language input 108 with respect to determining the command. For example, it may occur that the context-aware UI manager 102 simply presumes that such insufficiency will exist, before even receiving the natural language input 108. In other examples, the user interface 106 may provide the user 104 with the ability to indicate the user's belief that the natural language input 108 may be insufficient. In other examples, the language parser 122 may perform an initial parsing of the natural language input 108, and may thereby determine the insufficiency. Additionally, or alternatively, the command interpreter 126 may be configured to perform an initial interpretation of the natural language input 108 to determine the insufficiency thereof in determining the command from the command repository 128. Other example techniques for determining insufficiency of the natural language input 108 in determining the command are described herein, or would be apparent.

The natural language input may be parsed to determine parsed natural language input (204). For example, the language parser 122 may be configured to parse the natural language input 108 received from the input handler 118, in order to thereby determine parsed natural language input.

As referenced above, such language parsing may take one or more of various forms. For example, such language parsing may include determination of a semantic, syntactic, or grammatical characteristic of each word or phrase within the natural language input 108. In other examples, the language parser 122 may be configured to utilize a taxonomy, ontology, or other reasoning structure or technique for parsing the natural language input 108.

For example, an ontology may be available to the language parser 122 which enables the language parser 122 to reason about characteristics of the natural language input 108. For example, in a scenario in which the natural language input 108 is related to a command for executing transportation of a fluid, the language parser 122 may access an ontology related to shipments or other transportation of goods. In such an example, the ontology may include a structure which represents related characteristics or concepts which are associated with such transportations, as well as an expression of the relationships between the concepts. For example, such an ontology may include concepts such as types of goods to be shipped, types of carriers to execute the shipping (e.g., train, truck, or plane), time constraints related to such shipments, costs related to such shipments, or any other characteristics or features which may be related to execution of transporting goods.

As may be appreciated, such ontology may thus enable the language parser 122 to reason about characteristics of the natural language input 108. In this specific example, for example, the ontology may include types of goods to be shipped, including sub-concepts which further categorize such goods, such as, for example, whether the goods are flammable or not flammable. In such cases, as described in more detail below with respect to FIG. 3, the user who enters natural language input 108 related to transportation of, e.g., fuel, may not sufficiently express the need for appropriate action to be taken in shipping such a flammable material. Nevertheless, by accessing the appropriate ontology, the language parser 122 may recognize the need for such action to be taken (e.g., including selection of an appropriate type of transport vehicle).

As referenced above, the parsed natural language input may be provided by the language parser 122 in a format which is compatible with parsed context received from the context parser 124, as described herein. That is, the parsers 122, 124 may both be configured to provide their respective parsed outputs in a common format, e.g., using common terminology, common representations of the same or similar concepts, and otherwise being mutually compatible with one another for interpretation thereof by the command interpreter 126.

In order to accomplish this goal, context information associated with the user may be received (206). For example, the context monitor 120 may receive the context information 112 associated with the user 104. As described herein, such context information may include virtually any information associated with the user which potentially may be relevant to the natural language input 108 and the associated desired command.

As may be further appreciated, such context information may vary depending on, e.g., the natural language input, the desired command, the nature of the user interface 106, and various characteristics of, or associated with, the user 104. For example, where the user interface 106 includes a graphical user interface, then the context information may include the interaction history 114 of the user 104 in selecting or manipulating elements of the graphical user interface. In other examples, the context information 112 may include sensed objects 116 associated with the user 104, e.g., a security badge of the user 104, or other information associated with the authentication or identification of the user 104. Other context information associated with the user may include identifying characteristics of the user 104, of the role of the user 104 within an organization, or any other contextual information about the user 104 which potentially may be relevant to the natural language input 108 and/or the associated desired command.

The context information may be parsed to obtain parsed context information associated with the natural language input and with the command (208). For example, the context parser 124 may be configured to receive the context information 112 and to output parsed context information to the command interpreter 126.

In some examples, parsing of the context information may be relatively straight-forward, e.g., when only a relatively small amount of context information is available. For example, in scenarios in which the user interface 106 includes a graphical user interface, and the natural language input 108 is input as text into a text entry field of the graphical user interface, the context information 112 may include the interaction history 114 of the user 104 with respect to various icons, widgets, input fields, or other elements of the graphical user interface. In such cases, there may only be a single interaction of the user 104 with the graphical user interface (e.g., selection of a particular link or icon or other element). In other examples, however, the user 104 may have a detailed and lengthy interaction history with many elements of the graphical user interface. Thus, a degree to which the context parser 124 may be required to parse the context information 112 in order to obtain parsed context information which is related to the natural language input 108 and/or the associated desired command may vary a great deal in different specific implementations of the system 100.

In specific examples, for example, it may occur that the user 104 has had, and continues to have, a rich interaction history with many different elements of the graphical user interface representing the user interface 106. In such cases, only a small number of events of the interaction history may be relevant to the natural language input 108 and/or the associated, desired command. Consequently, the context parser 124 may execute various implementations for determining what of the context information should be retained and expressed within the parsed context information for use by the command interpreter 126 in interpreting the parsed natural language input from the language parser 122.

To name a few specific, non-limiting examples, the context parser 124 may restrict the context information 112 to a defined time window before and/or after receipt of the natural language input 108 (i.e., based on a temporal proximity of the context information to receipt of the natural language input 108). In other examples, the context parser 124 may perform an analysis of the context information 112, in order to reason about what of the context information 112 should be retained and expressed within the parsed context. For example, the context parser 124 may access the same ontologies, or different ontologies, available to the language parser 122. In additional or alternative examples, the context parser 124 may parse the context information 112 based on an analysis of the natural language input 108 and/or the parsed natural language input. In still other examples, the context parser 124 may be configured to receive an indication from the user 104 as to what portion of the context information 112 should be retained and expressed within the parsed context.

In addition to determining what portion of the context information 112 to include within the parsed context information, the context parser 124 may be configured, as referenced above, to express the parsed context in a format which is compatible with the parsed natural language input, for interpretation thereof by the command interpreter 126. For example, the context parser 124 may express the parsed context information in an abstracted form, and/or using a predetermined lexicon and/or associated terminology. Specific examples of such parsed context information, and representation thereof, are provided herein, or would be apparent to one of skill in the art.

The parsed natural language input may then be interpreted, using the parsed context information, to thereby determine the command (210). For example, the command interpreter 126 may interpret parsed natural language input from the language parser 122, using the parsed context information from the context parser 124, in order to determine the desired, associated command from the command repository 128. In a more specific example, the command interpreter 126 may access the same or different ontologies used by the parsers 122, 124.

Once the command had been determined, the command interpreter 126 may execute one or more associated subsequent actions. For example, as referenced above, the command interpreter 126 may provide the output 110 within the user interface 106. The output 110 may include, for example, a full and correct version of the command determined by the command interpreter 126, at which the point the user 104 may accept, or validate, or otherwise process the thus-provided command. Similarly, the output 110 may include multiple possibilities for the desired command, so that the user 104 may select the actual desired command therefrom. The command may be expressed using natural language, constrained natural language, or in a specified format used to store the command within the command repository 128.

In other examples, the command interpreter 126 may initiate an actual execution of the action desired by the user in response to the command, and provide the output 110 as an indication or other information of such action being initiated and/or completed. For example, if the desired command of the user 104 relates to shipment of goods, as referred above, then the command interpreter 126 may provide a complete and correct command as the output 110 for initiating such a shipment. In other examples, the command interpreter 126 may automatically initiate the desired action, (e.g., the specific shipment), and provide an indication of such execution as the output 110.

Figure 3:
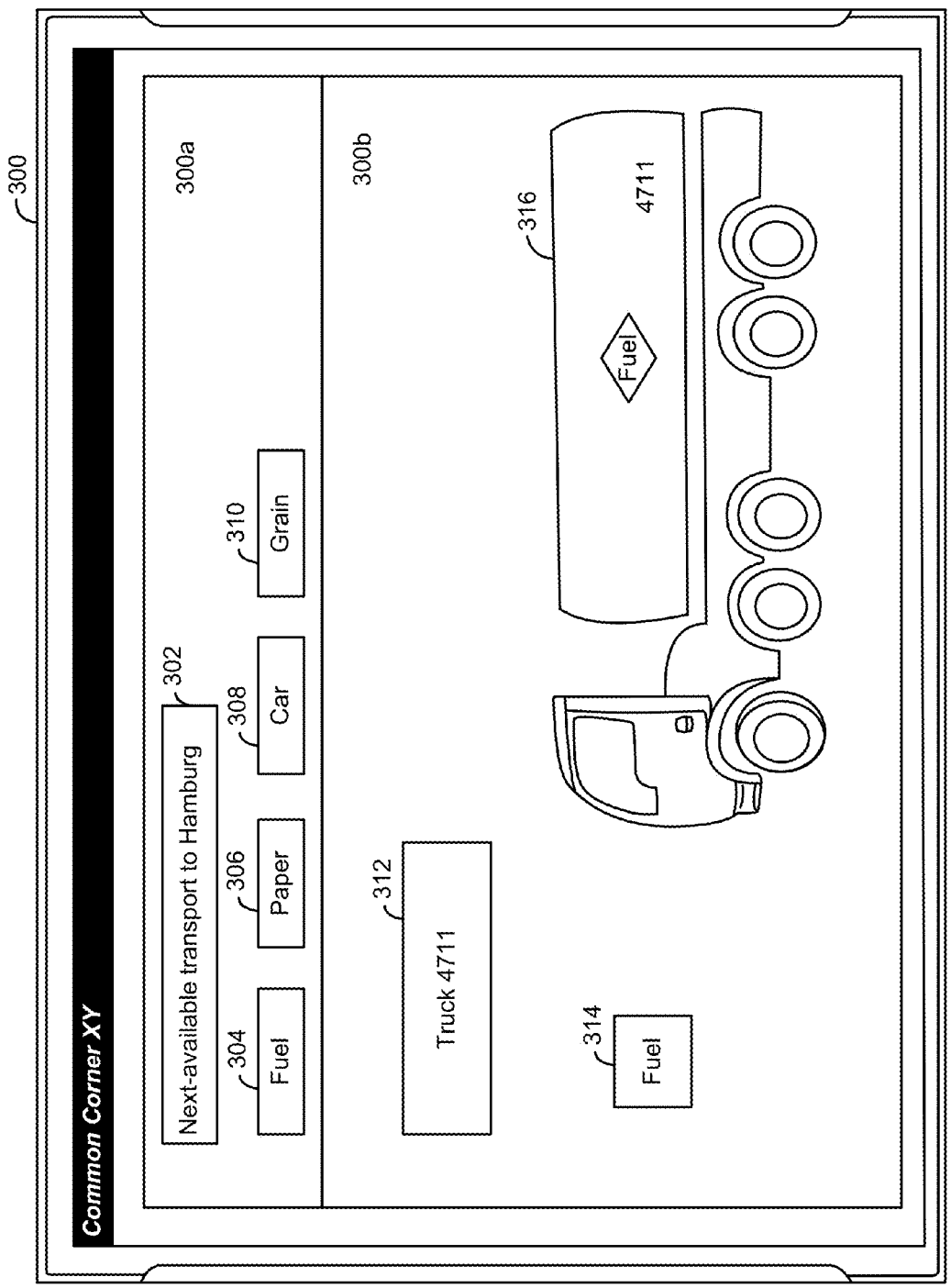
FIG. 3 illustrates an example of a user interface provided by the system of FIG. 1.

FIG. 3 is a screenshot 300 illustrating an example of the user interface 106. Specifically, as shown, the screenshot 300 includes an example in which the user interface 106 includes a graphical user interface, such as may be included within a browser window or other provider of graphical user interfaces.

In the example, an upper portion 300A of the screenshot 300 represents, or is associated with, input received from the user 104, while a lower portion 300B is associated with output provided to the user 104. Of course, such illustrations are merely for the sake of example, and may be appreciated that the information in the screenshot 300 may be presented in various other forms. For example, the portion 300A may represent a first page viewed by the user 104, while the portion 300B may represent a second or subsequent page viewed by the user 104 upon completion of use of the portion 300A.

In the example of FIG. 3, as referenced above, it may occur that the user 104 wishes to initiate a shipment. However, as described, the user 104 may be unaware of, or unable to enter, a complete and correct version of a command necessary to initiate the desired shipment. Thus, in the example of FIG. 3, the portion 300A includes a text entry field 302, as well as icons 304, 306, 308, and 310 which are associated with, respectively, fuel, paper, cars, and grain.

For example, the portion 300A may be included within business software used by an employer of the user 104 to execute an initial purchase and subsequent sale of various types of items, including the example shown in the figure of fuel, paper, cars and grain. Thus, the associated business software may be associated with all aspects of such purchases and sales, e.g., including the initial purchase transactions, shipment of the purchased goods to a warehouse of the business, subsequent ordering and delivery of the goods to retail establishments, and any other processing associated with the goods in question. Consequently, it may be appreciated that the user 104 may make use of various aspects of the associated business software, which may be related to one or more of the various examples just described, or other examples, as would be apparent. However, in the example of FIG. 3, a simplified version of the user interface 106 is illustrated which merely conceptually shows that the user 104 may interact with various graphical user interface elements, such as the element 304-310.

For example, the user 104 may initially be concerned with business processes associated with transportation or other processing of fuel that is to be purchased or sold. Consequently, the user 104 may have certain types of interaction history with the graphical user interface 300, in the context of such processing. In the simplified example of FIG. 3, for example, the user may select the fuel icon 304, e.g., by clicking on or otherwise selecting the fuel icon 304.

Meanwhile, the user 104 may attempt to enter a desired command into the text entry field 302, using natural language, as referenced above with respect to the natural language input 108. Specifically, as shown, the user 104 may enter the text "next available transport to Homburg."

As may be appreciated from the above discussion, such natural language input entered into the text input field 302 may be insufficient to determine the associated desired command, or to execute the desired action associated therewith. For example, as shown, the natural language input includes a destination, but not an origin, of the desired transport. Moreover, the natural language input does not identify the type of good that is desired to be transported, or other transportation parameters, such as the desired timeframe for the shipment in question, or other information which may be necessary to authenticate, authorize, or otherwise validate and ultimately execute the desired command.

It may be appreciated from the above discussion of FIG. 1 that the input handler 118 may thus receive the natural language input "next available transport to Homburg," for forwarding thereof to the language parser 122. Meanwhile, the context monitor 120 may detect, among other context information, selection of the fuel icon 304 by the user 104, as part of an interaction history of the user 104 with the graphical user interface 300. Although not specifically illustrated in FIG. 3, it may be appreciated that various other types of context information may be collected by the context monitor 120. For example, the context monitor 120 may determine location information associated with the user, (e.g., using conventional location determination techniques, e.g., based on an IP address of the user, or based on GPS data obtained with respect to the user). Other types of context useful in completing the desired command also may be collected, as would be apparent.

In the simplified example of FIG. 3, however, it may be appreciated that the language parser 122 output a parsed version of the natural language input received through the text entry field 302 to the command interpreter 126, including performing some or all of the various processing thereof as described above. Similarly, the context processor 124 may parse the context information (e.g., including the selection of the fuel icon by the user 104) to the command interpreter 126.

For example, the language parser 122 may parse the natural language input received from the text entry field 302 to thereby determine that an identification of the requesting party (i.e., the user 104) is not included. Similarly, the language parser 122 may select specific words, phrases, or other elements of the natural language input for conversion thereof into an appropriate format for use by the command interpreter 126. For example, the language parser 122 may alter the word "transport," such as in cases where the command interpreter 126 and/or the command repository 128 typically uses different terminology (e.g., "shipment") for the same or similar concept. Further, the language parser 122 may parse the destination (i.e., Hamburg) to identify more specific or more relevant information which may be useful in completing the command, such as an identification of a specific warehouse within Hamburg.

As referenced above, one or more of the language parser 122, the context parser 124 and/or the command interpreter 126 may be configured to access appropriate taxonomies, ontologies, or other reasoning resources which may be useful in determining the command desired by the user 104. For example, the command interpreter 126 may access a shipment or transportation related ontology, which may classify concepts including goods to be shipped in relationship to characteristics of the goods, and consequently in relationship to characteristics of how such shipments are to be executed. For example, as referenced above, such a transport ontology may classify goods as being flammable or non-flammable.

Consequently, when the command interpreter 126 receives the parsed context information identifying that the goods to be shipped includes fuel, the command interpreter 126 may access the appropriate ontology to identify first that the fuel shipment is categorized as flammable, and, at the same time, to determine a relationship of such flammable fuel to a necessary type of shipment vehicle (e.g., a tanker).

It may be appreciated that although the language parser 122 may be capable of accessing the same ontology, such capability is not useful to the language parser 122 in this example, because the user 104 fails to include reference to fuel as the object to be transported when providing the natural language input. Nonetheless, the user is provided with the benefit of the knowledge contained within the ontology, because the command interpreter 126 is able to leverage such knowledge through the use of (parsed) context information as described herein.

Consequently, as referenced above, the command interpreter 126 may access the command repository 128 to correctly determine a specific template, model, or abstraction of the desired command for initiating a shipment of a good to a desired location. Then, the command interpreter 126 may instantiate such a command from the command repository, using information determined from the parsed language and the parsed context information. Thereafter, the command interpreter 126 may provide the output 110, as referenced above with respect to FIG. 1.

Specifically, in the example of FIG. 3, an output portion 300B illustrates that the command interpreter 126 may provide an indication to the user 104 that fuel will be shipped in an appropriate fashion. Specifically, as shown, an output field 312 indicates that truck 4711 will be available for the shipment, while an icon 314 indicates recognition of the fact that the shipment includes fuel. A graphical element 316 illustrating the desired transport truck 4711 is also illustrated. In this way, the user 104 may be made aware that the desired command has been instantiated and is now available for validation, and, ultimately, for execution. Of course, the output portion 300B may include various other details, not specifically illustrated in the example of FIG. 3. For example, the output portion 300B may include an indication of the specific location within Hamburg (e.g., a specific warehouse), or may include relevant timeframes for the initiation or completion of the shipment.

In other implementations, the user 104 may enter the same or similar natural language input into the field 302 (e.g., "transport as soon as possible to Hamburg"), and yet may receive a different result within output portion 300b, depending on relevant context information. For example, if the user 104 selects the icon 306 related to paper in association with providing the natural language input, then the output portion 300b may include a different transportation scheme (e.g., a different type of vehicle, a different warehouse within Hamburg, or different departure/arrival times). Similar comments apply in cases where the user selects the icon 308, since, for example, a vehicle needed to transport automobiles would be very different from a vehicle needed to transport either paper or fuel.

Of course, as referenced, it may be difficult for the user 104 to be able to identify a specific vehicle or type of vehicle for a desired transport within the natural language input within the text entry field 302 (e.g., the user 104 simply may not remember or know the type of vehicle, or the nomenclature for specifying information). Nonetheless, in the example of FIG. 3, as may be appreciated, the user 104 is not required to know any specific information about how to identify such (types of) vehicles or other information within the natural language input. Instead, the user 104 is conveniently provided with such information by action of the context aware UI manager 102.

Figure 4:
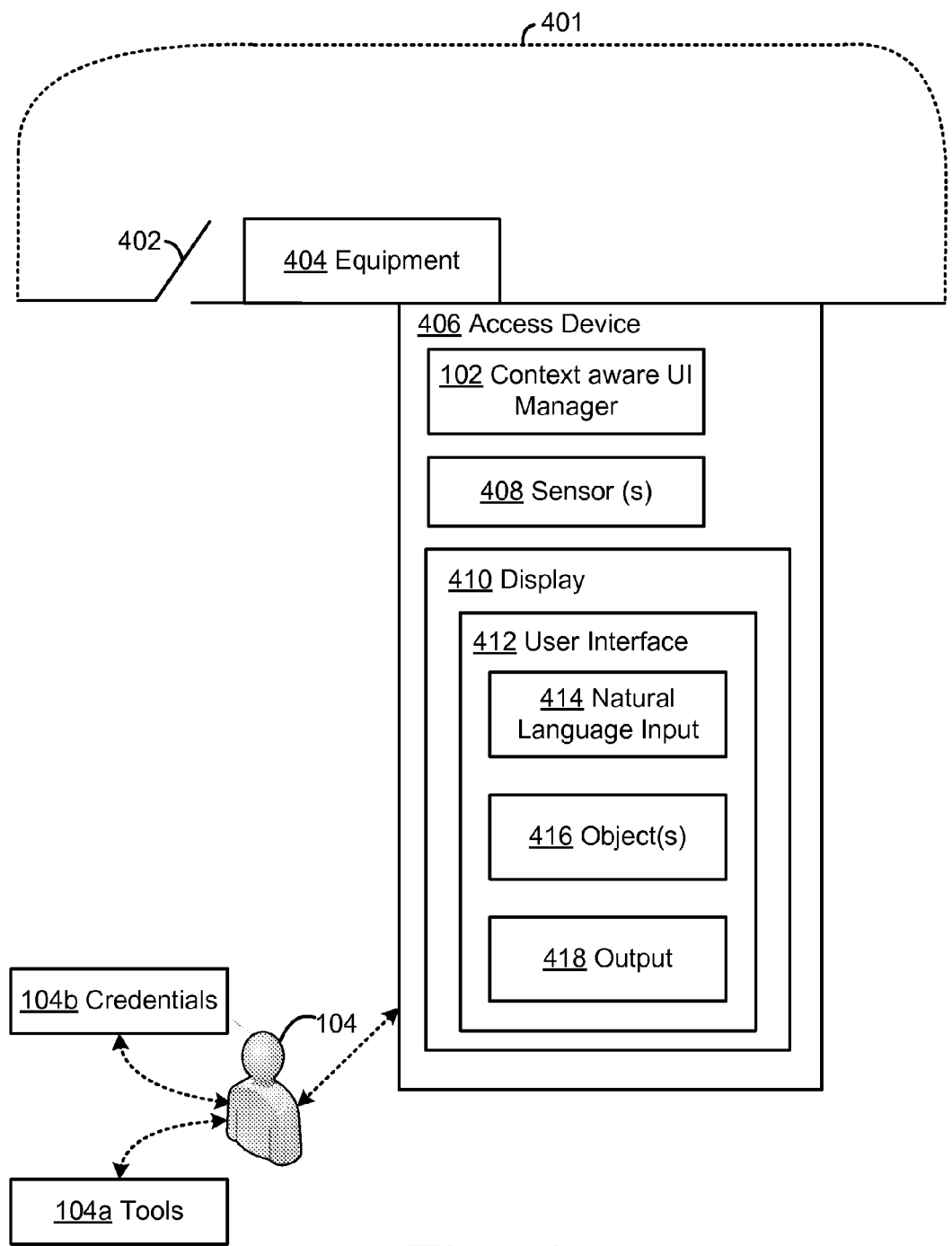
FIG. 4 provides a second example of a user interface implemented by the system of FIG. 1.

FIG. 4 is a block diagram of a second example implementation of the system 100 of FIG. 1. Specifically, as shown, FIG. 4 illustrates a scenario in which the user 104 seeks to gain admittance to an area 401, using an access point (e.g., a door) 402. Thus, as described below, FIG. 4 illustrates an example in which a command provided by the user 104 may be completed, validated, and authenticated or otherwise authorized, before execution of the action associated with the command may commence. In this way, in addition to the advantages described above of increased accuracy in interpreting desired commands, the system 100 may provide an additional layer of security in receiving and executing such commands.

Specifically, in the example of FIG. 4, the user 104 may desire to enter the area 401 through the access point 402, in order to perform maintenance on equipment 404. As may be appreciated, the area 401 may be a secured area, to which only authorized and authenticated individuals may be granted access. In the example, the user 104 may represent a person who does not normally have access to the area 401, but who is seeking access in order to perform a requested repair (e.g., an employee of a third-party repair service).

In the example, an access device 406 is illustrated as being associated with the area 401 and with the access point 402. For example, the access device 406 may represent a keypad in an associated display, or any other known technique for receiving requests from users wishing to enter the area 401 through the access point 402.

In the example of FIG. 4, the access device 406 includes the context-aware UI manager 102 executing thereon. The access device 406 further includes, or is associated with, various sensors 408 which may be configured to detect context information associated with the user 104, as described in detail below. Further, the access device 406 may include a display 410 which may be used to provide a user interface 412 which is analogous to the user interface 106 of the example of FIG. 1. Consequently, the user interface 412 may receive natural language input 414, may include various objects 416 (e.g., various graphical icons, widgets, input/output fields, or other graphical user interface elements), and may include a field 418 for providing output from context-aware UI manager 102.

Thus, in operation, the user 104 may approach the access point 402 and utilize the access device 406 to gain entry through the access point 402 for executing repair of the equipment 404. In so doing, the user 104 may provide the natural language input 414, such as, for example, "I want to enter to repair the equipment 404."

As described in detail above, such natural language input 414 may be insufficient for the access device 406 to provide entry through the access point 402. Nonetheless, as described, the context-aware UI manager 102 may detect or otherwise determine various context information associated with the user 104 in this scenario. For example, the sensors 408 may detect that the equipment 404 is, in fact, present within the area 401, which thus helps to validate an authenticity of the request of the user 104. Similarly, the sensors 408 may detect tools 104A carried by the user 104 which may be known according to the context parser 120 and/or the command interpreter 126 to be associated with repair of a specific type of the equipment 404. Further, the sensors 408 may detect credentials 104B of the user 104. For example, the user 104 may have been provided a security label which may include, for example, an RFID tag which may be detected by an RFID reader of the sensors 408.

Thus, as may be appreciated from the above discussion of FIG. 1, the context-aware UI manager 102 may receive the natural language input from the user 104, and may parse the natural language input 414 to obtain parsed natural language, in which the otherwise insufficient and possibly incorrect nature of the natural language input may be mitigated by representation of the natural language input 414 in a format which is amenable to interpretation by the command interpreter 126, and which represents the natural language input 414 in a manner that is as closely correlated as possible with the syntax, semantics, grammar, and other representations of commands within the command repository 128.

Then, the context-aware UI manager 102 may parse the various collected context information (e.g., context information regarding the equipment 404, the user 104, the objects 416, the tools 104A and/or the credentials 104B) in order to filter such context information and otherwise process the context information to obtain the parsed context information. The command interpreter 126 may thus use the parsed context information to interpret the natural language input 414.

As a result, the command interpreter 126 of the context-aware UI manager 102 may provide the output 418. As described, the output 418 may take various forms. For example, the output 418 may include a full and complete version of the desired command of the user 104, so that the user 104 may validate the command (e.g., the command to enter the area 401 through the access point 402). In other examples, the output 418 may simply include an indication of the success of the desired action, i.e., may indicate an ability to enter through the access point 402.

Thus, as may be seen in the examples of FIGS. 1-4, the context-aware UI manager 102 provides for techniques for processing and responding to user inputs of mixed modality. As described, natural language inputs received from users may be processed in view of manipulations of associated graphical user interface objects, or in view of other context information. Consequently, the context-aware UI manager 102 may leverage such manipulations of such graphical user interface objects, and other context information, as meaningful context for interpretation of the received natural language input from the users, and therefore as a basis for system response thereto. Thus, the context-aware UI manager 102 enables a highly responsive interaction style which is beneficial to the effective and efficient accomplishment of commands and associated actions desired by users.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a computer-readable storage medium and readable by at least one processor, the system comprising:
an input handler configured to cause the at least one processor to receive natural language input associated with a command, over a network, from a user through a graphical user interface;
a language parser configured to cause the at least one processor to parse the natural language input to determine parsed natural language input;
a context monitor configured to cause the at least one processor to receive context information associated with the user over the network, the context information including an interaction history of the user with respect to graphical elements of the graphical user interface, the interaction history including a selected graphical element;
a context parser configured to cause the at least one processor to parse the context information to obtain parsed context information associated with the natural language input and with the command; and
a command interpreter configured to cause the at least one processor to interpret the parsed natural language input, using the parsed context information, to thereby determine the command,
the command interpreter configured to output, over the network, the selected graphical element and at least one graphical element implied by the natural language input, based on the determined command, for display on an output section of the graphical user interface.

2. The system of claim 1, wherein the natural language input is received as text entry through the graphical user interface.

3. The system of claim 1, wherein the language parser is configured to determine that the natural language input, by itself, is insufficient to determine the command.

4. The system of claim 1, wherein the language parser is configured to cause the at least one processor to analyze a semantics, syntax, or grammar of the natural language input to obtain the parsed natural language input.

5. The system of claim 1, wherein the language parser and the context parser are configured to cause the at least one processor to express the parsed natural language input and the parsed context information, respectively, in a common format that is compatible with the command interpreter.

6. The system of claim 1, wherein the context parser is configured to parse the context information including filtering the context information based on a temporal proximity thereof to receipt of the natural language input.

7. The system of claim 1, wherein the context parser is configured to parse the context information including filtering the context information based on content of the natural language input.

8. The system of claim 1, wherein the command interpreter is configured to interpret the parsed natural language input using the parsed context information, and including performing a comparison with a plurality of commands which includes the command.

9. The system of claim 8, wherein the plurality of commands are expressed as templates, and wherein the command interpreter is configured to instantiate the command template associated with the determined command, based on the interpretation of the parsed natural language input with the parsed context information.

10. The system of claim 1, wherein the command interpreter is configured to provide the determined command using the user interface, including providing a complete version of the command for validation by the user.

11. The system of claim 1, wherein the command interpreter is configured to provide an indication of execution of an action associated with the command.

12. A computer-implemented method for causing at least one processor to execute instructions recorded on a computer-readable storage medium, the method comprising:
receiving natural language input associated with a command, over a network, from a user through a graphical user interface;
parsing the natural language input to determine parsed natural language input;
receiving context information associated with the user over the network, the context information including an interaction history of the user with respect to graphical elements of the graphical user interface, the interaction history including a selected graphical element;
parsing the context information to obtain parsed context information associated with the natural language input and with the command;

interpreting the parsed natural language input, using the parsed context information, to thereby determine the command; and outputting, over the network, the selected graphical element and at least one graphical element implied by the natural language input, based on the command, for display on an output section of the graphical user interface.

13. The method of claim 12, wherein the parsed natural language input and the parsed context information, respectively, are expressed in a common format for execution of the interpreting of the parsed natural language input, using the parsed context information.

14. A computer program product, the computer program product being tangibly embodied on a computer-readable medium and comprising instructions that, when executed, are configured to cause at least one processor to:

receive natural language input associated with a command, over a network, from a user through a graphical user interface;

parse the natural language input to determine parsed natural language input;

receive context information associated with the user over the network, the context information including an interaction history of the user with respect to graphical elements of the graphical user interface, the interaction history including a selected graphical element;

parse the context information to obtain parsed context information associated with the natural language input and with the command;

interpret the parsed natural language input, using the parsed context information, to thereby determine the command; and output, over the network, the selected graphical element and at least one graphical element implied by the natural language input, based on the determined command, for display on an output section of the graphical user interface.

15. The computer program product of claim 14, wherein the parsed natural language input and the parsed context information, respectively, are expressed in a common format for execution of the interpretation of the parsed natural language input, using the parsed context information.

16. The computer program product of claim 14, wherein the instructions, when executed, are configured to cause the at least one processor to provide the determined command using the graphical user interface, including providing a complete version of the command for validation by the user.

17. The computer program product of claim 14, wherein the instructions include instructions to analyze a semantics, syntax, or grammar of the natural language input to obtain the parsed natural language input.

18. The computer program product of claim 14, wherein the natural language input is received as text entry through the graphical user interface.

19. The computer program product of claim 14, wherein the instructions to parse the context information includes filtering the context information based on a temporal proximity thereof to receipt of the natural language input.

20. The computer program product of claim 14, wherein the instructions include instructions to interpret the parsed natural language input using the parsed context information, and perform a comparison with a plurality of commands which includes the command.

* * * * *